Apr. 3, 1923.                                          1,450,629
                        L. S. GRIGG
                    DRAINER FOR SINKS
                  Filed Aug. 4, 1922           2 sheets-sheet 1
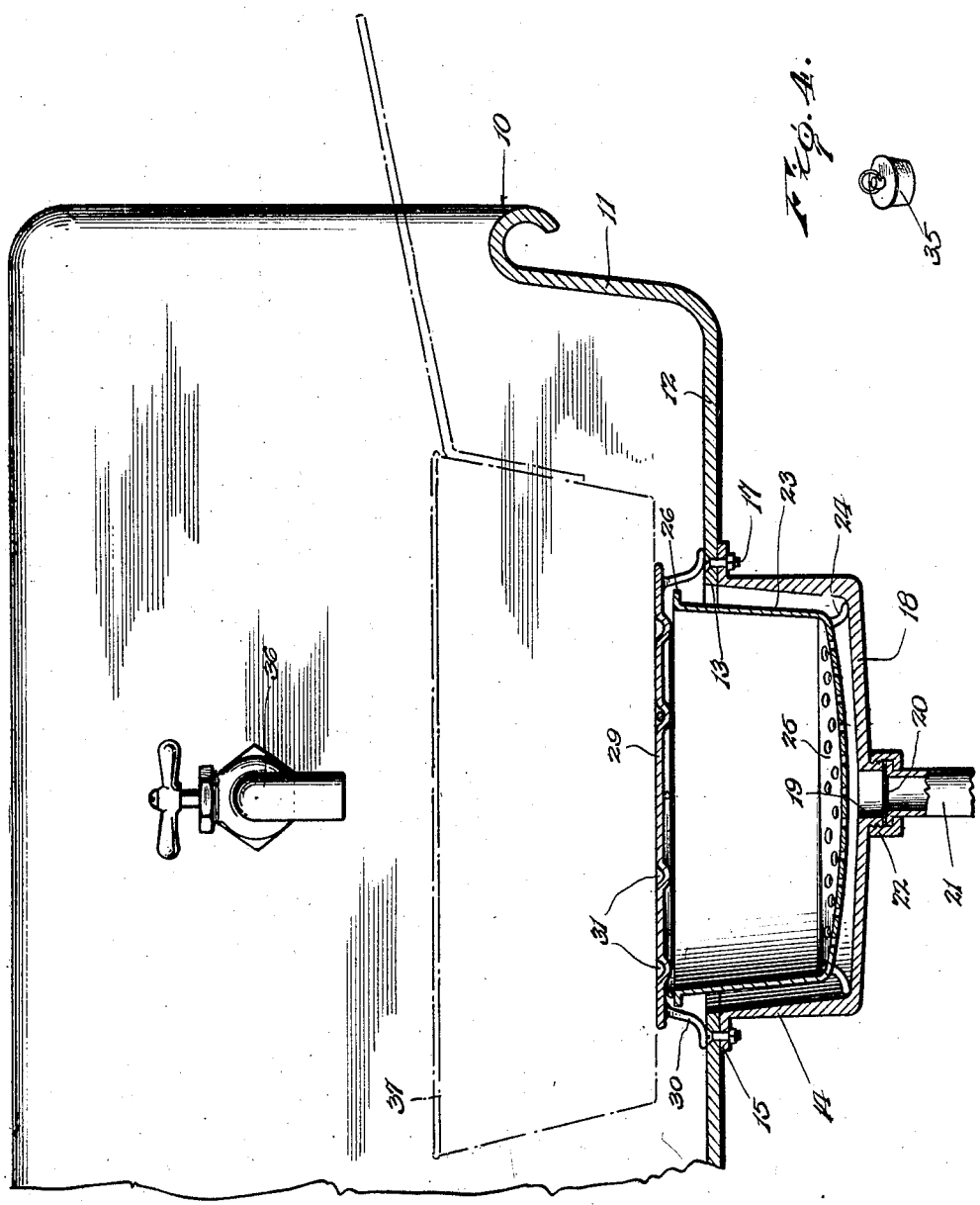
Inventor
Lilly S. Grigg.
By
Lacey & Lacey,   Attorneys

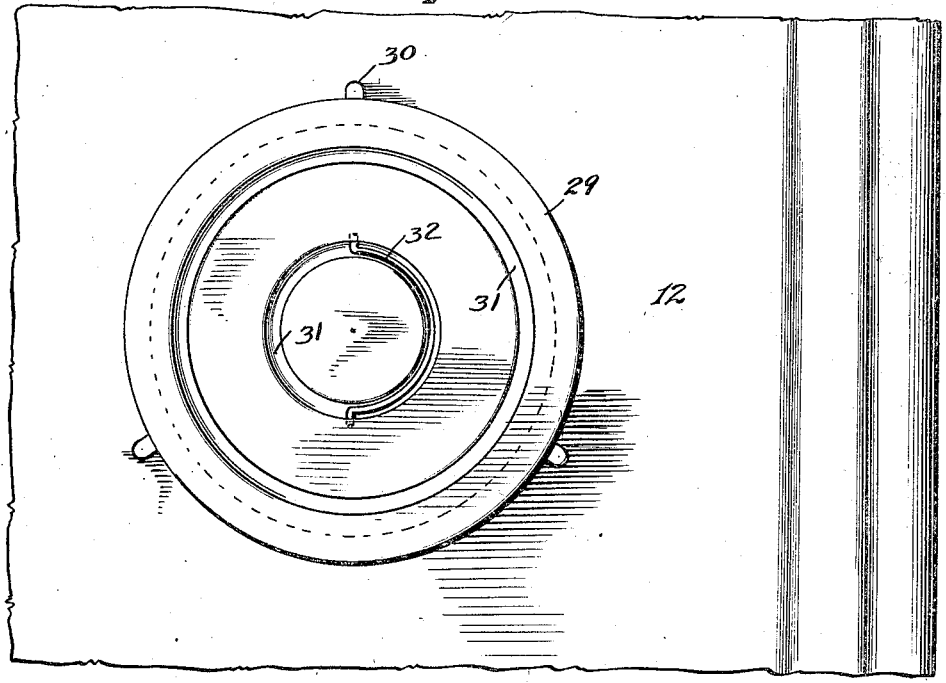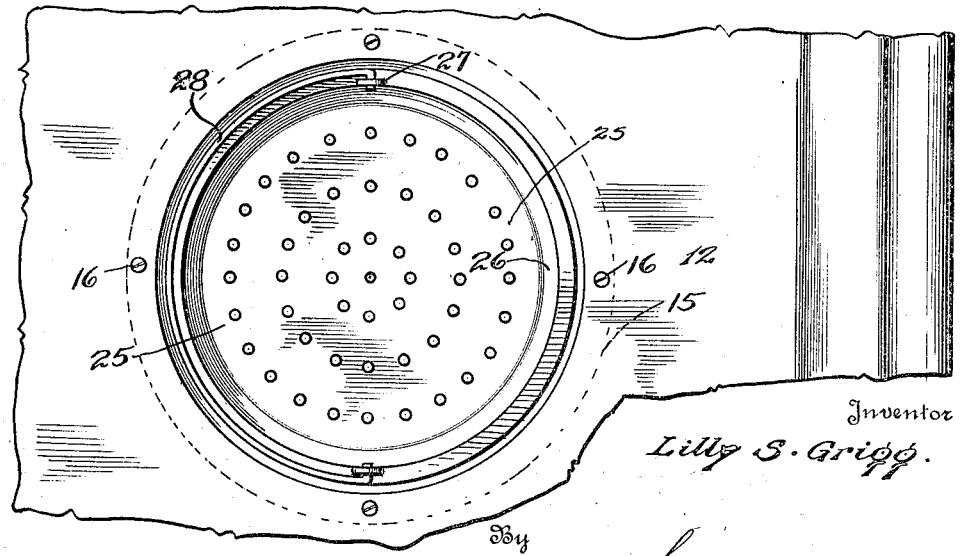

Patented Apr. 3, 1923.

1,450,629

UNITED STATES PATENT OFFICE.

LILLY S. GRIGG, OF LONG BEACH, CALIFORNIA.

DRAINER FOR SINKS.

Application filed August 4, 1922. Serial No. 579,725.

*To all whom it may concern:*

Be it known that I, LILLY S. GRIGG, citizen of the United States, residing at Long Beach, in the county of Los Angeles and State of California, have invented certain new and useful Improvements in Drainers for Sinks, of which the following is a specification.

The present invention relates to a device used in connection with a kitchen sink and the main object of the invention is to provide a sanitary sink in which all refuse such as bread crumbs, parts of vegetables, coffee grounds and tea leaves are prevented from being scattered over the sink bottom, but everything can be drained directly into the colander, and when full, the latter may easily be removed and emptied. A great advantage in using this colander is, that in cooking vegetables, fish, or onions all objectionable waters, as well as greasy matter can be poured or drained through the colander, thereby keeping the sink bottom clean and sanitary, as well as making work much easier, as the sink is prevented when using this device, from becoming stained or soiled, as usually is the case.

In the accompanying drawings one embodiment of the invention has been illustrated, and Fig. 1 shows a fragmentary sectional elevation of a sink with the device in position;

Fig. 2 is a top plan view of Fig. 1;

Fig. 3 is also a top plan view but with the cover removed and

Fig. 4 is a perspective view of a drain plug.

In the drawings reference numeral 10 represents a kitchen sink of the usual construction having upturned side walls 11 and a flat bottom 12. Instead of the usual small aperture provided for the draining of the sink, a larger opening 13 is in this case cut in the bottom 12. It is evident that existing sinks having only a small aperture for this purpose may be changed to have a larger opening like the one shown in Fig. 1 of the drawings.

Reference numeral 14 represents a basin having a flange 15 at its upper edge adapted to fit under the bottom 12 of the sink and the inner diameter of which coincides with the diameter of the opening 13 in the bottom of the sink. The flange 15 is perforated in several places as at 16 for the purpose of receiving clamp bolts and nuts 17 engaging in corresponding perforations in the bottom of the sink around the opening 13. By this means the basin 14 is rigidly and tightly secured under the bottom 12 of the sink. In the bottom 18 of the basin, preferably in the center thereof, is provided a small aperture 19, which opens in a drain pipe 21 and is protected by a crossbar or screen 20, placed low enough to allow a plug 35 inserted, in case sink is needed for washing many dishes at one time, giving the housewife a chance to wash or flush the dishes in the sink, when wanted in place of using a dish pan. The drainer or colander can at this time be lifted out and the plug inserted to prevent the water from running off until dishes are washed. This drain pipe 21 is held tightly against the bottom 18 by means of a threaded cap 22 in the usual manner.

Reference numeral 23 represents a drainer or colander, which is constructed in the shape of a pan with feet 24 under the bottom 25, which latter is perforated as best seen in Figs. 1 and 3. This colander is of smaller diameter but of greater depth than the basin 14, so that the sides and bottom of the colander will be spaced from the sides and bottom of the basin, thereby providing sufficient room for water to circulate outside of the colander. The top of the colander is preferably flanged as at 26 and provided with a pair of ears 27 intended to receive the ends of the handle 28. This handle is curved to a radius not greater than that for the outside periphery of the flange 26, so that, when the handle 28 is laid down upon the latter, it will not project beyond the same.

Reference numeral 29 represents a cover of greater diameter both than the opening 13 in the sink bottom, or the flange 26 of the colander, as best seen in Fig. 1. This cover is provided with a number of legs 30 of sufficient height to permit the cover to stand on the bottom of the sink without touching the top of the colander. The cover is corrugated or provided with annular grooves 31 and the handle 32 is secured on the upper side of the cover and adapted to fall into one of the grooves so as not to project above the top face of the cover when it is folded.

In Fig. 4 reference numeral 35 represents a plug that fits the aperture 19 in the bottom of the basin intended to close the same if it should be required to use it as a dish pan.

It will now be evident that the basin can be attached to ordinary sinks by cutting a large opening in the bottom thereof and drilling small holes for the counter-sunk heads of securing bolts 17 around the rim of the basin. The basin may then be enameled in position and will appear as forming an integral part with the sink, whereupon the drain pipe may be attached under the small aperture of the basin as already described.

The drainer or colander, which is to be installed in the basin of the sink is large enough to allow vegetables to be drained therein. When used as a dish washer, the colander will, on account of its peculiar construction, keep all coffee grounds and tea leaves from collecting in the sink or basin. Such refuse may be permitted to remain in the colander until all water is drained off, which is facilitated by the spacing of the drainer from the basin. When the refuse has been sufficiently dried in this manner, the colander may then be removed without splashing or soiling the sink or the floor and emptied in the garbage pail, whereupon the colander may be dried and wiped with a wash cloth. By such drying of the garbage this device also prevents the rapid deterioration of the garbage pail and tends to keep the latter as well as the sink in sanitary condition. By means of the feet under the colander and the spacing of it from the wall and bottom of the basin, it will be evident that water may be drawn from the spigot 36 and run through the sink without disturbing the contents of the colander, particularly as the top flange of the latter projects considerably above the bottom of the sink.

The function of the cover is to conceal the drainer or colander with its contents when in the basin and also to protect vegetables if deposited in the colander, while the sink is used for other purposes, furthermore to provide a dry place in the sink for a dish pan 37 or the like to stand on, when drawing water from the spigot. In this manner it will not be necessary to wipe the bottom of the dish pan as is usually the case. This also prevents the putting out of the fire from the wet bottom of the dish pan. The cover may also be placed elsewhere in the sink and the pan placed thereon while potatoes or other vegetables or fruit are being peeled directly into the colander.

It will now be clear that by the installation of the improved drainer in the kitchen sink, not only the appearance will be very neat but the device also provides a clean and sanitary sink.

Having thus described the invention, what is claimed as new is:

1. The combination with a sink having a large opening in its bottom; of a basin rigidly secured under said bottom so as to register with said opening and adapted to be connected with a drain pipe, a colander fitting loosely in said basin and having its top edge raised above the bottom of the sink, and a cover for said colander adapted to be supported upon the bottom of the sink so as to be slightly raised above the top edge of said colander.

2. The combination with a sink having a large opening in its bottom; of a basin rigidly secured in the bottom of the sink so as to register with said opening and adapted to be connected with a drain pipe; a colander fitting closely in said basin, feet on said colander for raising its bottom above the bottom of the basin and the top of the colander above the bottom of the sink; a cover of greater diameter than said large opening in the sink, legs under said cover of a height to support the cover on the bottom of the sink raised above the top of said colander.

In testimony whereof I affix my signature.

LILLY S. GRIGG. [L. S.]